United States Patent
Czompo (10) Patent No.: US 9,462,632 B2
(45) Date of Patent: Oct. 4, 2016

(54) CONCURRENT DATA STREAMING USING VARIOUS PARAMETERS FROM THE SAME SENSOR

(71) Applicant: QUALCOMM Incorporated, San Diego, CA (US)

(72) Inventor: Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 13/799,201

(22) Filed: Mar. 13, 2013

(65) Prior Publication Data

US 2014/0023087 A1    Jan. 23, 2014

Related U.S. Application Data

(60) Provisional application No. 61/672,677, filed on Jul. 17, 2012.

(51) Int. Cl.
*H04W 88/02* (2009.01)
*H04W 4/02* (2009.01)
*H04M 1/725* (2006.01)
(Continued)

(52) U.S. Cl.
CPC ............. *H04W 88/02* (2013.01); *G06F 3/00* (2013.01); *G06F 3/038* (2013.01); *G06F 3/0346* (2013.01); *H04W 4/02* (2013.01); *G01C 25/005* (2013.01); *G06F 2200/1614* (2013.01); *G06F 2200/1637* (2013.01); *H04M 1/72522* (2013.01); *H04M 2250/12* (2013.01)

(58) Field of Classification Search
CPC . H04W 4/02; H04W 88/02; H04M 2250/12; H04M 1/72522; G06F 3/038; G06F 2200/1614; G06F 2200/1637; G06F 3/0346; G06F 3/00; G06F 3/002; G06F 1/1632; G01C 25/005; H04L 67/2823; H04L 67/306; H04L 67/322; H04L 67/28; H04L 67/12; H04L 67/2842; H04L 67/125
See application file for complete search history.

(56) References Cited

U.S. PATENT DOCUMENTS 5,216,633 A      6/1993  Weon et al.
6,340,932 B1 *  1/2002  Rodgers ................... H01Q 7/00
                                                340/572.7
(Continued)

FOREIGN PATENT DOCUMENTS

WO    2004086748 A2    10/2004
WO    2008014154 A2     1/2008
(Continued)

OTHER PUBLICATIONS

Taiwan Search Report—TW102123498—TIPO—May 29, 2015.
(Continued)

*Primary Examiner* — Yee Lam
(74) *Attorney, Agent, or Firm* — Kilpatrick Townsend & Stockton LLP (57) ABSTRACT

Embodiments implement a device having a sensor optimizer, where a source data stream from a sensor module may be used by the sensor optimizer to create multiple sensor data streams having different data stream parameters (e.g. data rate, calibration, scaling, etcetera) from the source data stream. Such a sensor optimizer may intercept requests for sensor data from applications running on a mobile device processor, and concurrently provide data streams having different data stream parameters to applications executed by the processor.

18 Claims, 7 Drawing Sheets

(51) Int. Cl.
  *G06F 3/038*   (2013.01)
  *G06F 3/00*    (2006.01)
  *G01C 25/00*   (2006.01)
  *G06F 3/0346*  (2013.01)

(56) References Cited

U.S. PATENT DOCUMENTS

| | | | |
|---|---|---|---|
| 7,982,600 | B2 | 7/2011 | Gavrila et al. |
| 8,037,485 | B1 | 10/2011 | Goldman |
| 2001/0051850 | A1 | 12/2001 | Wietzke et al. |
| 2006/0284979 | A1 | 12/2006 | Clarkson |
| 2008/0133891 | A1 | 6/2008 | Salz et al. |
| 2009/0003599 | A1 | 1/2009 | Hart et al. |
| 2009/0224941 | A1 | 9/2009 | Kansal et al. |
| 2010/0073227 | A1 | 3/2010 | Waters et al. |
| 2010/0097464 | A1 | 4/2010 | Volpe |
| 2010/0304754 | A1 | 12/2010 | Czompo et al. |
| 2010/0318292 | A1 | 12/2010 | Kulik et al. |
| 2011/0106477 | A1* | 5/2011 | Brunner ............ G01R 33/0035 702/104 |
| 2011/0125404 | A1 | 5/2011 | Czompo |
| 2011/0215952 | A1 | 9/2011 | Aria et al. |
| 2011/0244810 | A1 | 10/2011 | Czompo |
| 2012/0083911 | A1* | 4/2012 | Louboutin ............ G06F 3/002 700/94 |
| 2012/0096921 | A1 | 4/2012 | Almalki et al. |
| 2012/0101762 | A1 | 4/2012 | Almalki et al. |
| 2012/0158296 | A1 | 6/2012 | Waters et al. |
| 2012/0203486 | A1* | 8/2012 | Almalki ................ G01C 17/28 702/96 |
| 2013/0006573 | A1* | 1/2013 | Brunner ................ G01C 17/38 702/141 |
| 2014/0023096 | A1 | 1/2014 | Czompo |

FOREIGN PATENT DOCUMENTS

| | | |
|---|---|---|
| WO | 2008090487 A1 | 7/2008 |
| WO | 2009/105709 A1 | 8/2009 |
| WO | 2012052070 A1 | 4/2012 |

OTHER PUBLICATIONS

International Search Report and Written Opinion—PCT/US2013/047295—ISA/EPO—Jan. 27, 2014.

* cited by examiner

CONCURRENT DATA STREAMING USING VARIOUS PARAMETERS FROM THE SAME SENSOR

CROSS-REFERENCE

This application claims priority from U.S. Provisional Patent Application No. 61/672,677 filed Jul. 17, 2012, entitled "CONCURRENT DATA STREAMING USING VARIOUS PARAMETERS FROM THE SAME SENSOR", which is hereby incorporated by reference, as if set forth in full in this document, for all purposes.

BACKGROUND

Aspects of the disclosure relate sensors. In particular, devices, systems, and methods for sensors having multiple output data streams with different data stream parameters for the different output data streams from the same sensor. Particular embodiments integrated with a mobile device such as a smart phone where multiple applications operating on the smart phone request information with different data stream parameters from the same sensor are provided.

Current mobile phones are frequently integrated with sensors. Examples of sensors may be light sensors such as cameras, or movement sensors such as accelerometers. Such sensors as currently structured within mobile devices are capable of outputting a single sensor data stream. Additional manipulation of the data in the sensor data stream will then be performed as part of a separate function or application of the mobile device. The single sensor data stream may be copied and altered by a processor of the mobile device, but the sensor module itself outputs a single data stream.

As the power of mobile devices such as smart phones increase, greater and more diverse types of applications are operated on such mobile devices, and there is therefore a growing need for new and useful techniques and structures for providing sensor data for sensors integrated in mobile devices.

BRIEF SUMMARY

Various embodiments described herein include devices, systems, and methods for sensors having multiple output data streams with different data stream parameters for the different output data streams from the same sensor. For example, one potential embodiment is a method comprising: receiving, at a sensor optimizer, a first request from a processor for sensor data from a first sensor element, the first request for sensor data identifying a first set of data stream parameters; receiving, at the sensor optimizer, a second request for sensor data from the first sensor element, the second request identifying a second set of data stream parameters that are different from the first set of data stream parameters; requesting, by the sensor optimizer, a source data stream from the first sensor element, using a source set of parameters based on the first set of data stream parameters and the second set of data stream parameters; creating, by the sensor optimizer, a first sensor data stream from the source data stream, wherein the first sensor data stream conforms to the first set of data stream parameters; creating, by the sensor optimizer, a second sensor data stream from the source data stream, wherein the second sensor data stream conforms with the second set of data stream parameters; and concurrently communicating the first sensor data stream and the second sensor data stream to the processor.

Another potential method according to such an embodiment may function where the first request for sensor data comprises including a request for calibrated data; wherein the first sensor data stream conforms to the first set of data stream parameters and comprises the calibrated data.

Another potential method according to such an embodiment may additionally function where the second request for sensor data comprises a request for uncalibrated data; wherein the second sensor data stream conforms with the second set of data stream parameters and comprises the uncalibrated data. Another potential method according to such an embodiment may additionally function where the first request for sensor data is received from a first application operating on the processor and wherein the second request for sensor data is received from the first application operating on the processor.

Another potential method according to such an embodiment may additionally function where the first request for sensor data is received from a first application operating on the processor and wherein the second request for sensor data is received from a second application operating on the processor.

Another potential method according to such an embodiment may additionally function where the first application comprises a camera application and the second application comprises a navigation application. Another potential method according to such an embodiment may additionally function where the first sensor element comprises a gyroscope. Another potential method according to such an embodiment may additionally function where the first sensor element comprises an accelerometer.

Another potential method according to such an embodiment may additionally function where the first application comprises a user interface orientation control application and wherein the second application comprises a navigation application. Another potential method according to such an embodiment may additionally function where the first request for sensor data is received from a first application operating on the processor and wherein the second request for sensor data is received from a second application operating on a second processor within a mobile device that comprises the processor.

Another potential method according to such an embodiment may additionally function where creating the first sensor data stream and the second sensor data stream comprises: receiving the source data stream from the first sensor element at a signal multiplexing module of the sensor optimizer; outputting the first sensor data stream from the signal multiplexing module to a first output register of the sensor optimizer; and outputting the second sensor data stream from the signal multiplexing module to a second output register of the sensor optimizer.

Another potential method according to such an embodiment may additionally function where concurrently communicating the first sensor data stream to the first application and the second sensor data stream to the second application comprises: communicating the first sensor data stream from the first output register to the first application of the processor via a sensor addressing module beginning at a first time and ending at a second time; and communicating the second sensor data stream from the second output register to the second application of the processor via the sensor addressing module beginning at a third time and ending at a fourth time, wherein the third time is later than the first time and the third time is earlier than the second time.

Another potential embodiment may be a device comprising a first sensor module comprising a first sensor element;

a sensor optimizer coupled to the first sensor module; and a processor coupled to the first sensor module via the sensor optimizer; wherein the sensor optimizer receives a source sensor data stream from the first sensor module and concurrently outputs to the processor at least two sensor data streams derived from the source sensor data stream.

Another potential device according to such an embodiment may additionally function where the sensor optimizer comprises: a plurality of digital filters coupled to the first sensor element by a signal multiplexing module; a plurality of output registers, each output register coupled to one corresponding digital filter of the plurality of digital filters; and a sensor addressing module coupled to the plurality of output registers.

Another potential device according to such an embodiment may additionally function where the sensor optimizer further comprises a first calibration module;
wherein the plurality of digital filters comprises a first digital filter and a second digital filter; wherein the processor executes a plurality of applications, each application of the plurality of applications providing a set of data stream parameters to the processor for communication to the sensor addressing module as part of a request for sensor data by each application of the plurality of applications; wherein the plurality of output registers comprises a first output register coupled to the first digital filter and a second output register coupled to the second digital filter; and wherein the first digital filter is coupled to the first output register via the first calibration module Another potential embodiment may be a device comprising: means for intercepting a source sensor data stream from a sensor module; means for creating at least two different sensor data streams derived from the source sensor data stream; and means for concurrently outputting the at least two different sensor data streams to a processor.

Another potential device according to such an embodiment may additionally comprise means for intercepting requests for sensor data streams from the processor to the sensor module; and means for adjusting a set of sensor stream parameters for each sensor data stream to match requested sensor stream parameters from the intercepted requests for sensor data streams.

Another potential device according to such an embodiment may additionally comprise means for intercepting a second source data stream from a second sensor module; means for creating second at least two different sensor data streams derived from the second source sensor data stream; and means for concurrently outputting the second at least two different sensor data streams to the processor.

Another embodiment may be a non-transitory computer readable storage medium comprising computer readable instructions that, when executed by a processor coupled to the storage medium, cause a device to perform a method comprising: communicating from the processor to a sensor optimizer, a first request for sensor data from a first sensor element, the first request for sensor data identifying a first set of data stream parameters; communicating from the processor to the sensor optimizer, a second request for sensor data from the first sensor element, the second request identifying a second set of data stream parameters that are different from the first set of data stream parameters; requesting, by the sensor optimizer, a source data stream from the first sensor element, using a source set of parameters based on the first set of data stream parameters and the second set of data stream parameters; creating, by the sensor optimizer, a first sensor data stream from the source data stream, wherein the first sensor data stream conforms to the first set of data stream parameters; creating, by the sensor optimizer, a second sensor data stream from the source data stream, wherein the second sensor data stream conforms with the second set of data stream parameters; and concurrently receiving at the processor the first sensor data stream and the second sensor data stream.

Additional embodiments of such a non-transitory computer readable storage medium may function where the method further comprises: executing, by the processor, a first application that initiates the first request for sensor data; and executing, by the processor, a second application concurrent with the execution of the first application, wherein the second application initiates the second request for sensor data.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present innovations relate to sensors and electronic devices with integrated sensors. In particular, devices are described which may integrate a sensor element with a processor. The processor may operate multiple applications concurrently, with each application requesting information from the sensor element. Various embodiments may function to provide concurrent and distinct data streams that are tailored to different applications.

For example, in one potential embodiment, a smart phone having a navigation application and a camera application may operate the applications concurrently. The navigation application may use the gyroscope data to assist with providing directions by measuring movement of the device and updating directions as the device moves. The camera application may use gyroscope data for an image stabilization function. These two different uses may have differing requirements for the data. The image stabilization function of a camera application may work more effectively if a calibration is determined and corrected for continuously in real-time. The navigation application on the other hand may require uncalibrated data because real-time calibration and correction may introduce discontinuities or jumps into the data which may degrade navigation performance. Additionally, the applications may require different data rates, or different settings for other parameters. Use of a single data stream to provide data for both devices may therefore create inefficiencies and/or performance degradation in one or both of the applications. According to various embodiments, a first data stream may be created with calibrated data creating a real time bias correction for image stabilization in the photography application, and a second data stream may be created with uncalibrated data for the navigation application, with each data stream having additional parameters that may or may not be different.

Another potential example is a device such as a phone or a tablet computer including an accelerometer as a sensor element, with a user interface orientation control application and a navigation application. The user interface orientation control application may request calibrated data at a lower frequency in order to present data to the device screen in the correct portrait-landscape orientation as a user rotates the device. A navigation application may request uncalibrated data at a higher frequency in order to assist in presenting directions to the user. A system able to create concurrent calibrated and uncalibrated data streams for these applications may provide improved application performance.

As described herein, a "sensor element" refers to any component of a device used to measure a physical characteristic and output a signal that describes that characteristic. One example of a sensor element includes a camera and other light detecting elements that convert light into an electronic signal. Another example includes accelerometers and elements that measure movement. A further example is a global positioning receiver that receives satellite signals in order to output an electronic signal identifying a location of the receiver functioning as the sensing element. A sensor element may be any such transceiver or measuring element.

As described herein, a "module" refers to a set of components integrated as part of a device to perform functions as a unit. Modules may include circuitry, software, firmware, or any combination of these to perform various functions. For example, a wireless module may include an antenna, and any firmware and software for basic functionality in sending and receiving signals using the antenna.

As describe herein, a "sensor module" refers to a set of integrated components including a sensor element that outputs the signal describing the characteristic measured by a sensor element. Such components integrated with the sensor element may include active components that format and buffer the signal from the sensor element in forms usable by a processing element. Examples of such components include analog to digital converters that may convert an analog signal output from a sensor element into a digital signal usable by a general purpose computing processor to perform specific algorithms implemented as applications in a device including a sensor module. In various sensor modules, sensor elements may be integrated with circuit components to create integrated system on a chip structures that are fabricated and attached to a single integrated circuit die which is directly coupled to the sensing element. In other sensor modules, a printed circuit board may include various components with the sensing element directly coupled to the components using conductive lines in the printed circuit board.

As described herein, a "data stream" refers to information output over time. For example, certain sensor elements may function to constantly output an analog signal as measurements of a physical characteristic of the environment of the sensor element are measured. The information being output as part of the constant output from the sensor element may be a sensor data stream. In various alternative embodiments, a data stream may be periodic, random, or associated with specific requests for information directed to a sensor module.

As described herein "concurrently output sensor streams" refers to multiple sensor streams for which data from at least a portion of each sensor stream is output at the same time as data from at least a portion of another sensor stream is output. The output of each sensor stream need not begin or end at the same time. This merely refers to data from a first sensor stream being output from a sensor module at the same time as data from a second sensor stream is output from a sensor module.

Figure 1:
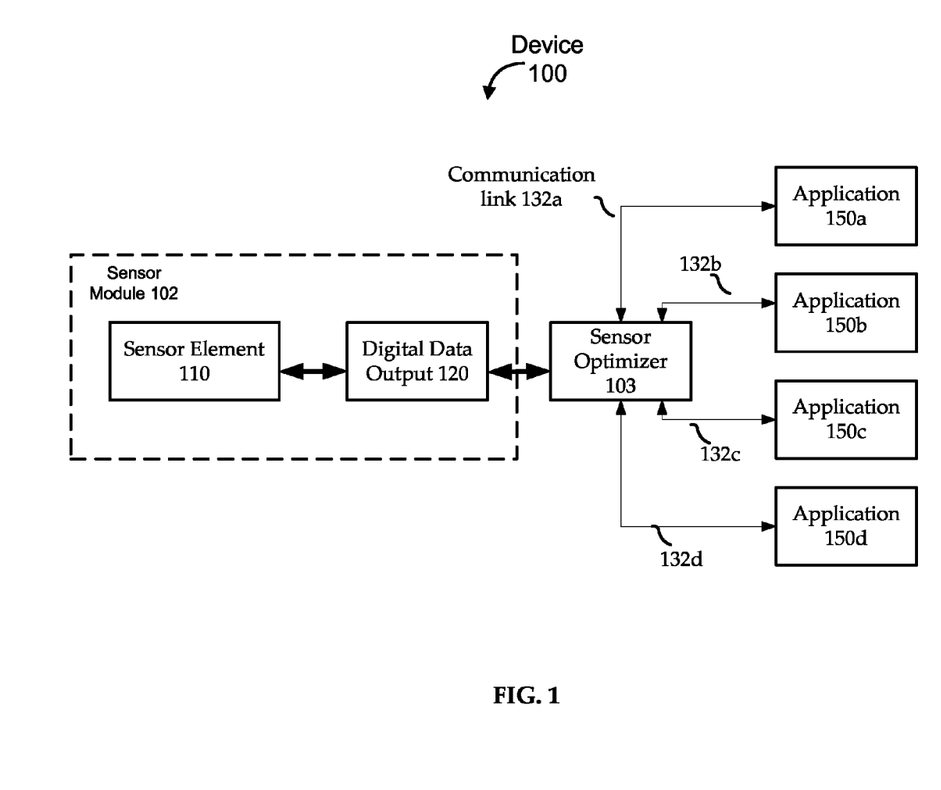
FIG. 1 shows a diagram of a device according one potential embodiment.

Referring to FIG. 1, device 100 illustrates one potential non-limiting example of a device. Device 100 includes sensor 102 which may include sensor element 110 and digital data output 120. Device 100 also includes sensor optimizer 103, and applications 150a-d. Device 100 may additionally include communication links 132a-d communicatively coupling sensor optimizer 103 to respective applications 150a-d. Although four applications are shown in FIG. 1, any number of two or more applications may function in accordance with various embodiments.

Sensor 102 may be any sensing device integrated with device 100 and includes a sensor element 110 for receiving information. For example, sensor 102 may be a gyroscope, an accelerometer, a magnetometer, a charge coupled device (CCD), a photovoltaic cell, any light sensing device, a temperature sensing device, a pressure sensing device, or any other potential sensing device or element.

Digital data output 120 may comprise an analog to digital converter for sensor elements that create analog data, and may further comprise digital filters, device calibration settings, biases, and scale factors. In various embodiments, sensor element 110 may be integrated with digital data output 120 as part of an integrated circuit or packaged electronic device that may then be further integrated into device 100.

Sensor optimizer 103 may comprise a hardware module or a software module for receiving a data stream from sensor element 110 via digital data output 120, and converting the single data stream from sensor element 110 into multiple data streams which may be communicated to applications 150 via communication links 132. Similarly, both applications 150 and communication links 132 may be implemented as hardware modules, firmware module, software modules or as any combination of such modules. For example, in one potential embodiment, a device 100 may comprise a single processor such as processor 710 described in FIG. 3. The single processor may implement sensor optimizer 103, applications 150a, 150b, 150c, and 150d, and may further implement communication links 132a, 132b, 132c, and 132d. In alternate embodiments, sensor optimizer 103 may comprise an integrated circuit or device coupled to one or more processors or hardware modules that implement applications 150. Communication links 132 may be one or more conductive lines within device 100. Any module within device 100 may be implemented using hardware elements, firmware elements, software elements, or any combination of elements to implement the module.

Figure 2:
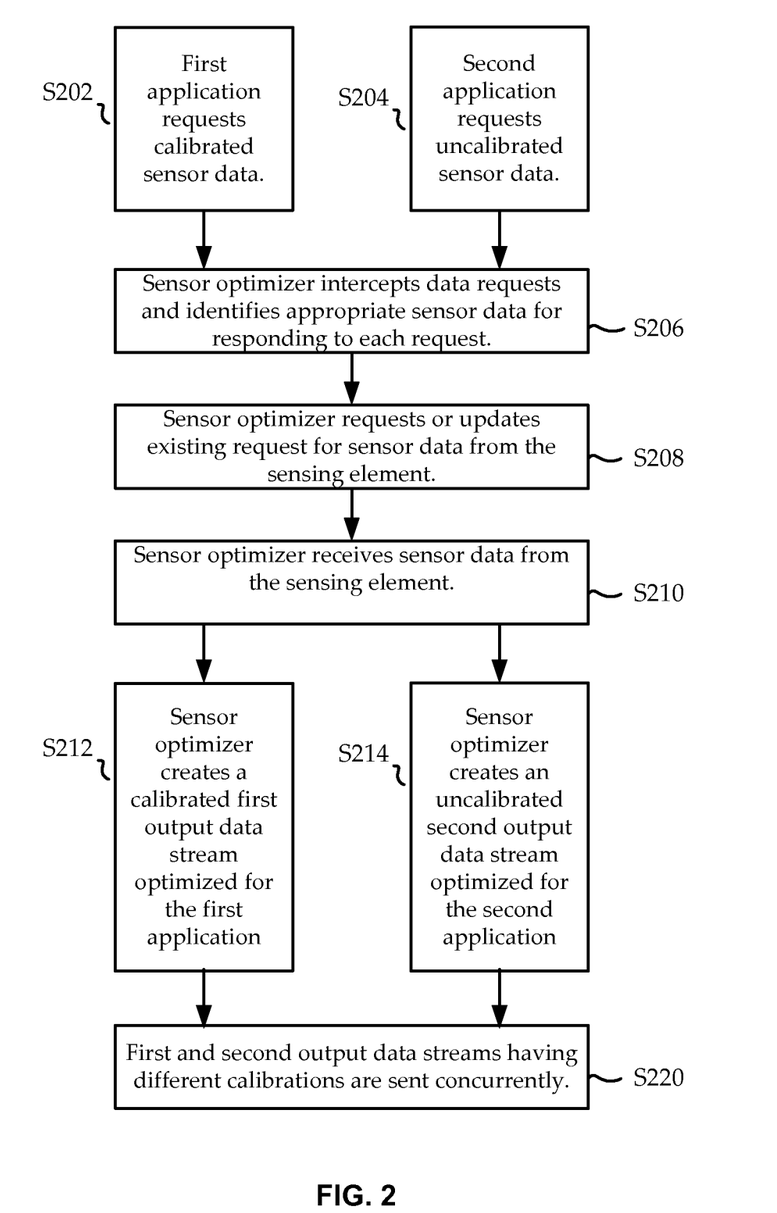
FIG. 2 illustrates a method according to some embodiments.

FIG. 2 describes a method of implementing an embodiment. In step S202 a first application 190a may request information regarding available data streams from sensor element 110. Such a query may attempt to identify unused data streams which may have parameters adjusted to match the preferences of the first application, or may provide a set of preferred parameters with a request to identify whether a data stream conforming to the identified parameters is available. In step S204, the first application 190a may receive a communication from sensor addressing module 160 identifying the availability of a data stream, and application 190a may communicate the request for the data along with the parameters.

In step S206 a second application 190b operating in a device 100 may request sensor data and identify a set of parameters. Unlike application 190a, second application 190b may have no integrated system for acknowledging that multiple streams of data may exist. Instead, another module such as sensor addressing module 160 may receive the request, identify the availability of an appropriate data stream, set the corresponding digital filter 130 and calibration module 140 settings based on the request from application 190b, and communicate the data stream to application 190b in a way that is transparent to application 190b. These requests in S204 and S206 may occur at the same time, or may initially occur at separate times, such that one data stream may exist at the time another data stream is created in response to a request for sensor data. In various alternative embodiments, all or any combination of applications may function in a manner similar to that of application 190a described above. In other alternative embodiments, all or any combination of applications may function in a manner similar to that of application 190b. Additionally, in still further embodiments, any number of two or more applications may function within a device with concurrent data streams.

In step S210, the sensor addressing module 160 may receive any data requests, and identify appropriate sensor data for responding to each request. Such identification may simply identify an output register identified by the application, or may match provided parameters with available data streams. In step S212, any necessary updates to calibration selections (relating to e.g. biases and scale factors), data rates, frequency filters, or any other settings may be updated for a particular data stream based on a data request. In step S214, after the appropriate data streams are set based on the requested parameters, sensor addressing module 160 may concurrently route the data stream to the corresponding appropriate application. For example, if digital filter 130d and calibration module 140d are set using parameters provided by application 190a, and if digital filter 130a and calibration module 140a are set to match parameters provided by application 190b, then the data from output register 150d may be sent to application 190a concurrently with the data from output register 150a being sent to application 190b.

Such a system may operate with a first data stream being sent continuously, while a second data stream starts and stops repeatedly in response to various application requests. Such a system may further operate with any number of additional data streams being sent concurrently, and with additional data streams starting and ending while other data streams operate, with each data stream having a different set of parameters. Further, in certain embodiments, certain applications may be sent the same data stream or different data streams having the same parameters, while multiple additional applications receive a concurrently transmitted data stream having different parameters.

In various alternative embodiments, a combination of parameters such as a data rate, inclusion of calibration parameters, and adjustment of dynamic value ranges, a data rate, a data calibration, a data output range, a data output resolution, a sampling rate, a measurement range, a filtering frequency, or any other such parameter may be used. Such parameters may be set by digital filter 230b, calibration module 240, or any other additional module.

An additional potential example of an embodiment may now be described. In one potential embodiment, sensor addressing module 160 may contain information that the data stream associated with output register 150a includes calibrated data with a sampling rate of 20 Hz and output register 150b includes uncalibrated data with a sampling rate of 100 Hz. If an application 190c requests calibrated data at a sampling rate of 20 Hz, the information from output register 150a by simply be sent to application 190c. If application 190d requests uncalibrated data at 200 Hz, the digital filter 130b may be modified to adjust the sampling rate, and when the data in output register 150b has been adjusted to match the parameter request from application 190d, the data may be sent to application 190d.

As described by FIG. 2, one potential implementation of negotiating parameters for an application requesting sensor data is to query a sensor module for available streams. In various alternative embodiments, an application may send a request for a data stream having certain parameters. The sensor addressing module may receive such a request, and identify whether a stream with current parameters equal to the requested parameters exist. If a data stream with currently parameters equal to the requested parameters does exist, the sensor addressing module may respond either by communicating the data stream to the application, or by identifying the data stream. The parameters for that data stream may then be fixed until released by the application. Alternatively, a communication may be sent to the application prior to a later update of the parameters for that data stream, indicating that the data stream will no longer match the requested parameters.

If a data stream having current parameters equal to the requested parameters does not exist, the sensor addressing module may identify an available data stream and communicate with the filters and/or calibration modules associated with that data stream to update the data stream to parameters that match the requested data stream. The data stream or an identifier associated with the data stream may then be sent to the requesting application. If all data streams are in use and none of the data streams match the requested data stream parameters, an indication that no data stream is available may be sent in response to the request for the data stream having the set of data stream parameters.

Figure 3:
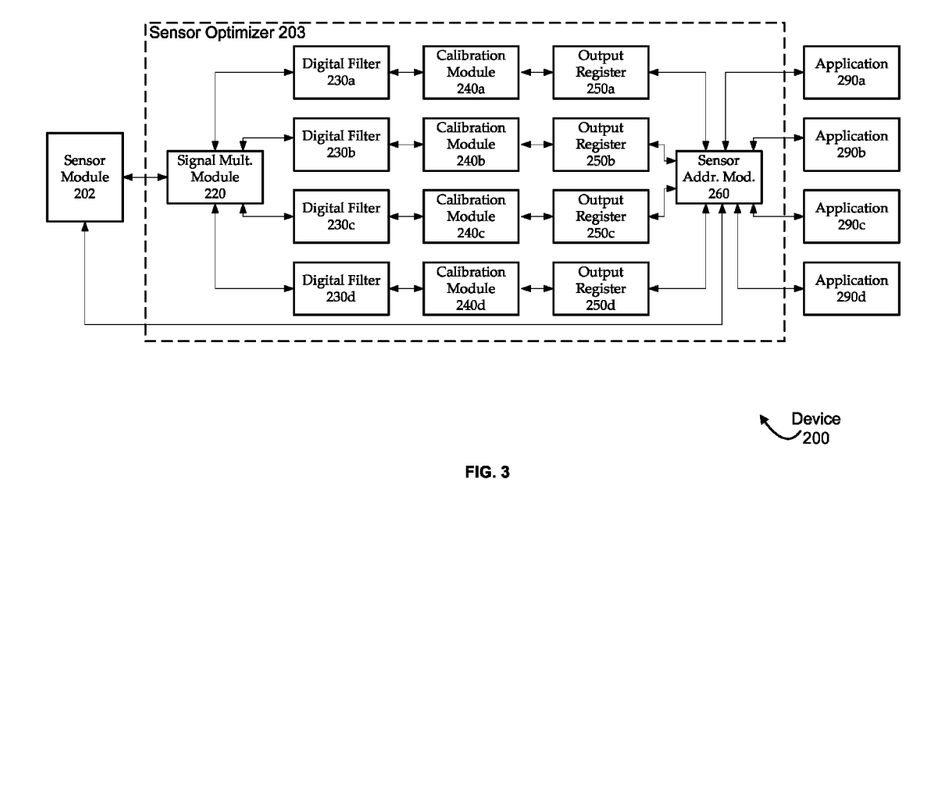
FIG. 3 shows a diagram of a device according one potential embodiment.

Referring to FIG. 3, one particular embodiment of a sensor optimizer is illustrated. Device 200 includes sensor module 202, sensor optimizer 203, and applications 290a-d. The embodiment of sensor optimizer shown as sensor optimizer 203 comprises signal multiplexing module 220, digital filters 230a-d, calibration modules 240a-d, output registers 250a-d, and sensor addressing module 260. Although four digital filters 230, four calibration modules 240, and four output registers 250 are shown, any number of two or more of some elements may be present in accordance with the various embodiments. Similarly, although four applications are shown in FIG. 3, any number applications may function in accordance with various embodiments as the application or applications request and receive at least two concurrent sensor data streams from a single sensor module.

Sensor module 202 may be any sensing device integrated with device 200. For example, a sensor element may be a gyroscope, an accelerometer, a magnetometer, a charge coupled device (CCD), a photovoltaic cell, any light sensing device, a temperature sensing device, a pressure sensing device, or any other potential sensing device or element.

Signal multiplexing module 220 may convert sensor data from sensor element 210 into multiple streams of data for use by multiple digital filters 230 as separate signals.

Digital filters 230 may comprise hardware digital filters that may be configurable to adjust various parameters of a data stream associated with each corresponding digital filter 230. For example, a filtering frequency may be set by digital filter, along with a sampling rate and measurement rage. Such settings may be communicated directly to digital filter 230 by sensor addressing module, or may be communicated to digital filter 230 by any appropriate signal path. In various embodiments, digital filters 230 may alternatively comprise firmware, hardware, software, or any combination in or to implement any kind of digital manipulation or digital processing on a sensor source data stream.

Calibration modules 240 may function to modify various data streams with calibration data. In one potential embodiment, each calibration module 240 comprises a memory that stores calibration data. Such calibration data may be created as part of an operation of a device, where a known input is provided to sensor element 210, and the output of sensor element 210 is compared with the values of the known input to create calibration data. The calibration data may then be stored for use by calibration modules 240. Similar to the function of digital filters 230, calibration modules 240 may have an input to receive a command directly from sensor addressing module 260 to modify an associated data stream using the calibration data or not to modify the associated data stream using the calibration data. Such an input may comprise a direct signal from sensor addressing module 260, or an input via any other possible path for a command input to calibration module 240. In various embodiments, calibration modules 240 may be implemented in hardware, firmware, software, or any combination of these. Calibration modules 240 may thus be implemented using memory that stores calibration data, and may further comprise or be connected to one or more processors that use the calibration data to create a calibrated data stream from a source data stream.

In various embodiments, calibration data may be created in a factory setting, where all units are compared with a known sensing target in order to compensate for variations in sensor output measurements when a sensor optimizer is in a device with sensor modules. In alternate embodiments, a device user may perform a calibration routine as part of a calibration application in the device to update calibration parameters. In still further embodiments, a device may include automated calibration routines that continuously or periodically implement an automated calibration or calibration update to create a real or near real-time calibration.

Output data register 250 may then store data for an associated data stream from the respective digital filter 230 and calibration module 240. Such a register may be any acceptable data storage device or memory. When an application 290 requests information from sensor element 210, it may request such information by directly addressing a specific output register 250 in a communication with sensor addressing module 260, or it may simply request a data stream with a set group of parameters, and allow sensor addressing module 260 to request data from an output register 250 after verifying that digital filter 230 and calibration module 240 for the corresponding output register 250 match the parameters as closely as possible. In certain embodiments, the sensor optimizer may "spoof" a sensor module, such that when a processor communicates a message to a sensor module, the sensor optimizer may intercept the request as discussed above. In the example of FIG. 3, the sensor addressing module may intercept the request from an application operating on the processor, and then may communicate a request for a source sensor data stream to the sensor module 202. In certain embodiments, a sensor optimizer application executed by a processor may operate in conjunction with sensor optimizer 303 to facilitate interception of requests for sensor data.

In additional alternative embodiments, sensor addressing module 260 may further include elements for creation of additional data streams. For example, if six different data streams are requested from the sensor element 210, addressing module 260 may comprise firmware, hardware, or software for creating additional data streams from the data streams in output data registers 250. Sensor addressing module may further be able to create multiple output streams from a single stream in an output data register, and modify one or more of the multiple data streams by adjusting a calibration, a sampling rate, a bandwidth, or any other such data stream parameter. In such embodiments, a sensor addressing module 260 may include or be connected to a memory element or memory module that stores calibration data, and may further include or be connected to a processing element or processing module. Sensor addressing module may then output multiple data streams with different parameters using a data stream from a single output data register such as output data register 250*a*.

Figure 4:
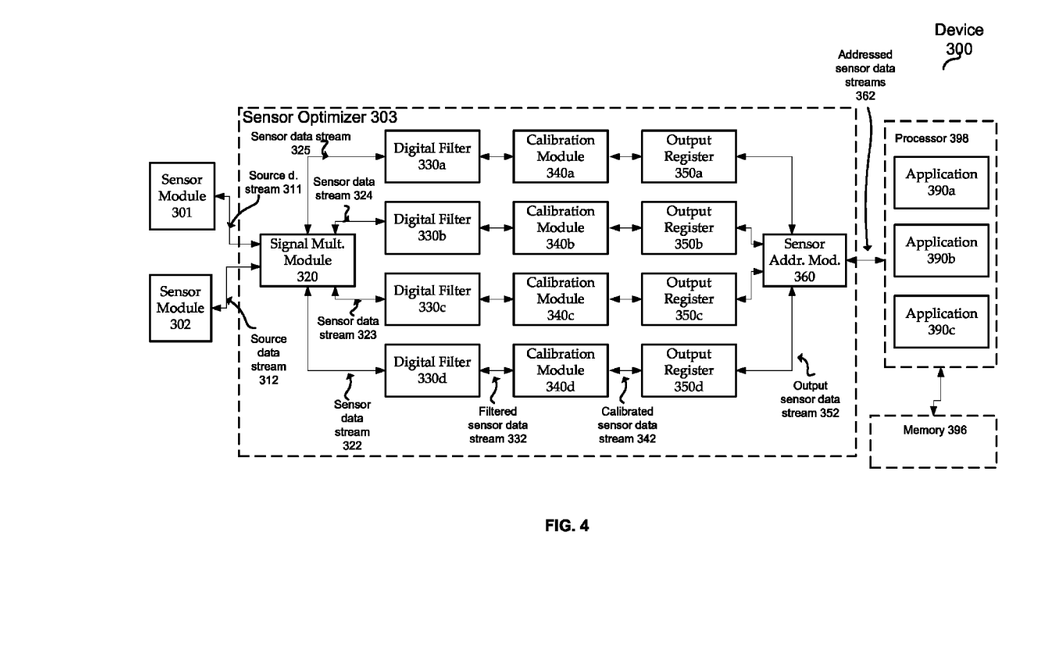
FIG. 4 shows a diagram of a device according one potential embodiment.

FIG. 4 describes another example of a device according to another potential embodiment. Device 300 of FIG. 3 includes a first sensor module 301, a second sensor module 302, a sensor optimizer 303, a processor 398, and a memory 396. Sensor optimizer 303 includes signal multiplexing module 320, digital filters 330*a-d*, calibration modules 340*a-d*, and output registers 350*a-d*. Sensor module 301 and sensor module 302 may be different types of sensor modules. For example, sensor module 301 may function as a gyroscope module and sensor module 302 may function as a camera module. In alternate embodiments, these sensor modules may be redundant modules that perform the same function.

In the embodiment of FIG. 4, sensor multiplexing module 320 may serve a dual function of creating multiple sensor data streams from a single source data stream, and may also function as a switch to select different source data streams from different sensor modules for different circuitry paths associated with an output register. Thus, for example, if three sensor data streams are requested from sensor module 301 by applications operating on processor 398 and one sensor data stream is request from sensor module 302, signal multiplexing module 320 may create three sensor data streams 323, 324, and 325 from source data stream 311 and a single sensor data stream 322 from source data stream 312. The various sensor data streams 322-325 may then be modified by corresponding digital filters 330 and calibration modules 340 to match sensor stream parameters requested by the processor, before being buffered at output registers 350 for communication to processor 398 via sensor addressing module 360.

In the embodiment of FIG. 3, signal sensor addressing module 360 routes sensor data and requests for sensor data between sensor module 301 and 301 and processor 398. Thus in certain embodiments, a single sensor optimizer may function to enable addressing and data stream creation for multiple sensor modules. In alternate embodiments, each sensor module may have a separate sensor optimizer or groups of sensor modules may be associated with different sensor optimizers in any potential combination.

Further, as shown by FIG. 3, applications 390a, 390b, and 390c operate as executed by processor 398 in conjunction with non-transitory storage memory 396. Such applications may function as executed by processor 398 to request sensor data from sensor modules 300 and 400, and may store such sensor data for use within memory 396 as part of each application. In one potential embodiment, an application executed by processor 398 may function in conjunction with sensor optimizer 303 to manage interception of requests for sensor data, to manage the requests for different sensor stream parameters, and to managing conflicting or excessive numbers of requests for sensor data.

FIG. 3 further shows signal paths for sensor data and sensor data streams derived from sensor modules 301 and 302. For example, source data streams 311 is received at signal multiplexing module 320 from sensor 301, and source data stream 312 is received at signal multiplexing module 320 from sensor module 320. These source data streams may be output from the sensor modules in response to a request received at the sensor module from the processor in conjunction with an application managing a sensor optimizer, in response to a request from sensor addressing module 360, or in response to a communication along a sensor data stream path such as the path from output register 350 to sensor module 301 via signal multiplexing module 320, digital filter 330a, and calibration module 340a. Signal multiplexing module 320 outputs sensor data streams 322, 323, 324, and 325, which may be created using any combination of source data streams 311 and 312.

Signal multiplexing module 320 may essentially be considered as outputting data streams along separate hardware or circuitry paths, each of which has an output register 350 for storing and managing output of a sensor data stream. While filtering and calibration adjustments may be made to a particular sensor data stream prior to that stream being managed by an output register, the signal received at the register is still considered to be the same sensor data stream despite any changes made to set certain data stream parameters on the sensor data stream.

For example as shown in FIG. 4, sensor data stream 322 may be modified by digital filter 330d to create a filtered sensor data stream 332, which may further be modified by calibration module 340d to create a calibrated sensor data stream 342 which is input to output register 350d, but the calibrated filtered sensor data stream received at output register 350 is still considered to be sensor data stream 322.

Just as for other embodiments, while the example shown in FIG. 4 includes a calibration module and digital filter for each circuitry path, any combination of modules and paths may be present in alternative embodiments to enable concurrent output of at least a portion of first and second data streams from a single sensor module having different data stream parameters.

Figure 5:
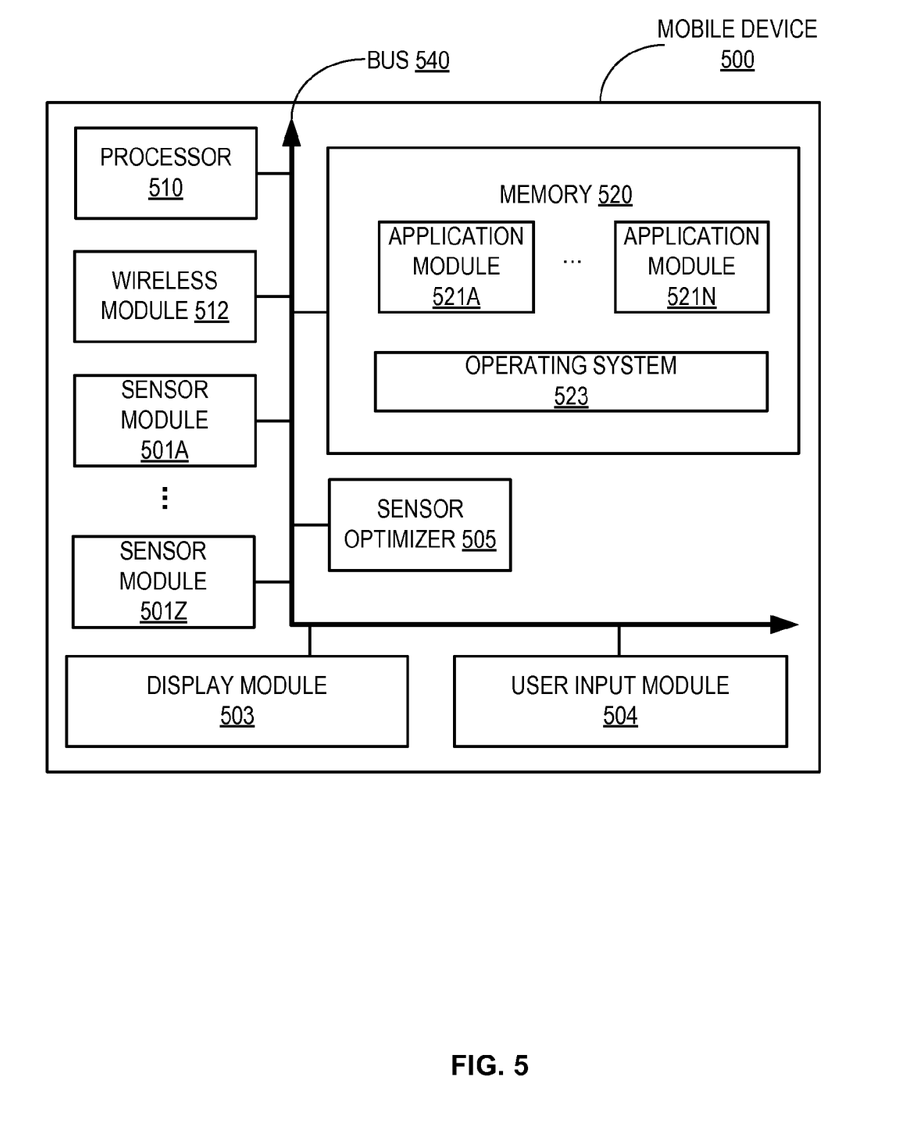
FIG. 5 shows a diagram of a mobile device according one potential embodiment.

FIG. 5 is block diagram illustrating one potential embodiment of a mobile device that may be used in conjunction with embodiments described herein. Such mobile devices include sensor modules and one or more sensor optimizers to enable a single sensor module to output concurrent sensor data streams having different data stream parameters. Such a mobile device may also execute applications as described in conjunction with various embodiments, such that the applications may request sensor data having different data stream parameters from a single sensor module. Mobile device 500 of FIG. 5 may be any mobile device such as a smart phone, cellular phone, personal digital assistant, tablet computer, personal media player as well as any other type of portable electronic device offering similar or combined functionality. It should be appreciated that device 500 may also include tactile buttons, a power device (e.g., a battery), as well as other components associated with a portable electronic device such as a smart cellular telephone. Accordingly, FIG. 5 is not to be construed as limiting because some components are omitted.

In the embodiment shown at FIG. 5, device 500 includes processor 510 configured to execute instructions for performing operations at a number of components and can be, for example, a general-purpose processor or microprocessor suitable for implementation within a portable electronic device. Processor 510 is communicatively coupled with a plurality of components within mobile device 500. To realize this communicative coupling, processor 510 may communicate with the other illustrated components across a bus 540. Bus 540 can be any subsystem adapted to transfer data within mobile device 500. Bus 540 can be a plurality of computer buses and include additional circuitry to transfer data.

Memory 520 may be coupled to processor 510. In some embodiments, memory 520 offers both short-term and long-term storage and may in fact be divided into several units. Memory 520 may be volatile, such as static random access memory (SRAM) and/or dynamic random access memory (DRAM) and/or non-volatile, such as read-only memory (ROM), flash memory, and the like. Furthermore, memory 520 can include removable storage devices, such as secure digital (SD) cards. Thus, memory 520 provides storage of computer readable instructions, data structures, program modules, and other data for mobile device 500. In some embodiments, memory 520 may be distributed into different hardware modules.

Mobile device 500 includes sensor optimizer 505 that may intercept requests from application modules 521A-N being executed by processor 510 as the application modules make requests for sensor data from sensor modules 501A-Z. Additionally, as described above, an application modules 521 may include a sensor optimizer application module that may function in conjunction with sensor optimizer 505 to enable interception of requests for sensor data, to assist in addressing particular sensor data streams with particular data stream parameters, and to manage to available sensor data streams from one or more sensor modules 501 in conjunction with sensor optimizer 505.

In some embodiments, memory 520 stores a plurality of application modules 521A-N. Application modules 521A-N contain particular instructions to be executed by processor 510. Memory 520 can store any number of application modules. A respective one of application modules 521A-N can be, for example, a calendar application, a geo-fencing application, a power management application, a smart alert application, a social media application (e.g., Twitter™ or Facebook™), or any application-type module having instructions to be executed by processor 510. Any such applications may access sensor data by communicating a request for sensor data or a sensor data stream to a sensor addressing module. In some embodiments, memory 520 includes an operating system 523. Operating system 523 may be operable to initiate the execution of the instructions provided by application modules 521A-N and/or manage sensor modules 501. Operating system 523 may be adapted to perform other operations across the components of device 500 including threading, resource management, data storage control and other similar functionality.

In some embodiments, mobile device 500 includes one or more wireless modules 512. Wireless modules 512 may include a Wi-Fi transceiver, a transceiver for communicating with cellular telephone towers, or any other such module for implementing wireless communications.

Additionally, in some embodiments, mobile device 500 includes a plurality of sensor modules 501A-501Z. Each sensor module 501 is a physical module within device 500. However, while each of modules 501 is permanently configured as a structure, a respective one of modules 501 may be temporarily configured to perform specific functions or temporarily activated. A common example is an application module that may program a camera module (i.e., sensor module) for shutter release and image capture that is activated for image capture and deactivated after image capture, or activated for creation of a sensor data stream in the form of a video capture stream, and deactivated when capture of the video data is complete. Further, in addition to sensor modules 501, and number of additional hardware modules with particular functionality may be included within mobile device 500. A respective one of modules 501 can be, for example, an accelerometer, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensor modules 501 may be implemented in software.

In addition to sensor modules 501 and application modules 521A-N, mobile device 500 may have a display module 503 and a user input module 504. Display module 503 graphically presents information from device 500 to the user. This information may be derived from one or more application modules 521A-N, one or more sensor modules 501, a combination thereof, or any other suitable means for resolving graphical content for the user (e.g., by operating system 524). Display module 503 can be liquid crystal display (LCD) technology, light emitting polymer display (LPD) technology, or some other display technology. In some embodiments, display module 503 is a capacitive or resistive touch screen and may be sensitive to haptic and/or tactile contact with a user. In such embodiments, the display module 503 can comprise a multi-touch-sensitive display.

Figure 7:
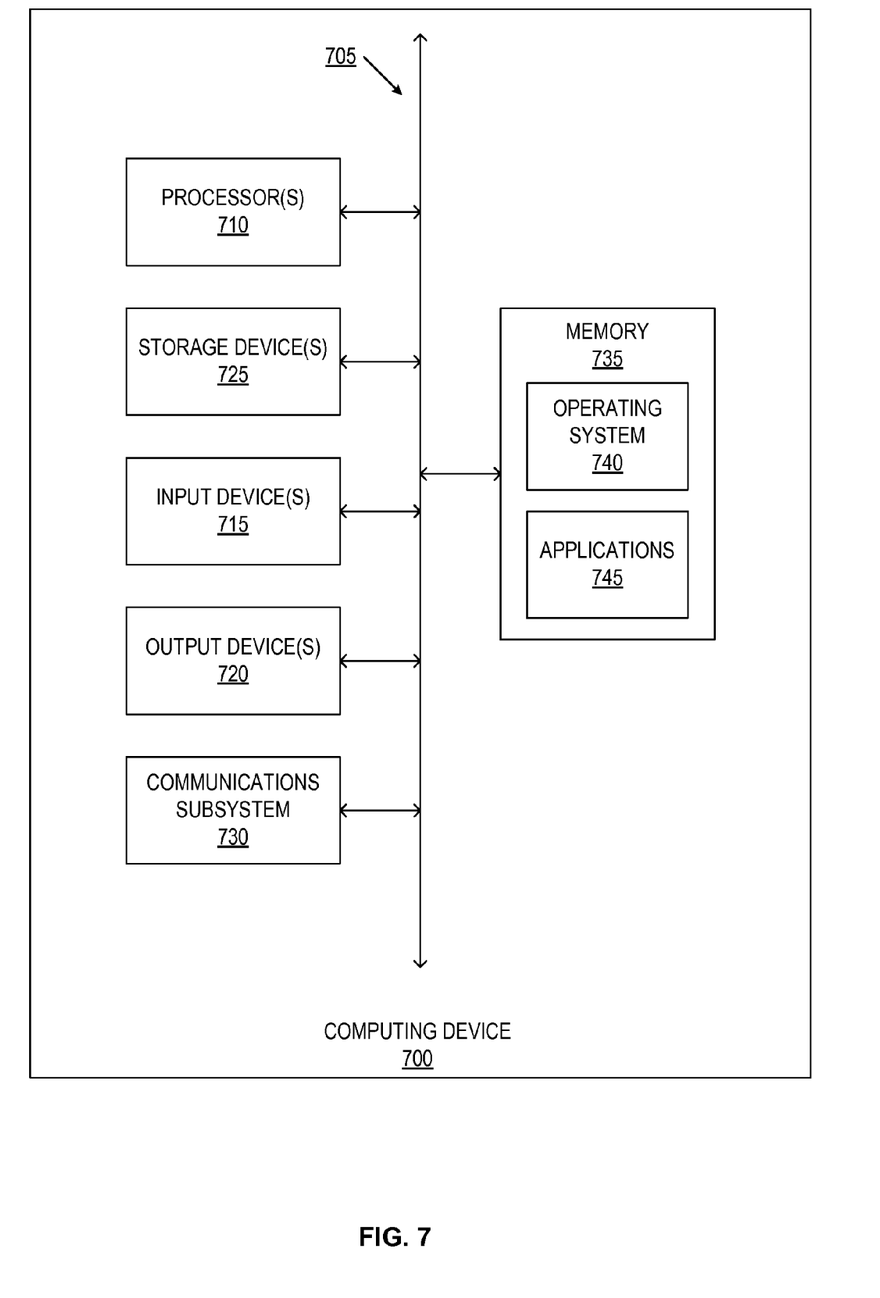
FIG. 7 illustrates an example computing system in which one or more aspects of the disclosure may be implemented.

Additional embodiments of a mobile device may further comprise various portions of computing devices as are detailed below with respect to FIG. 7.

Figure 6:
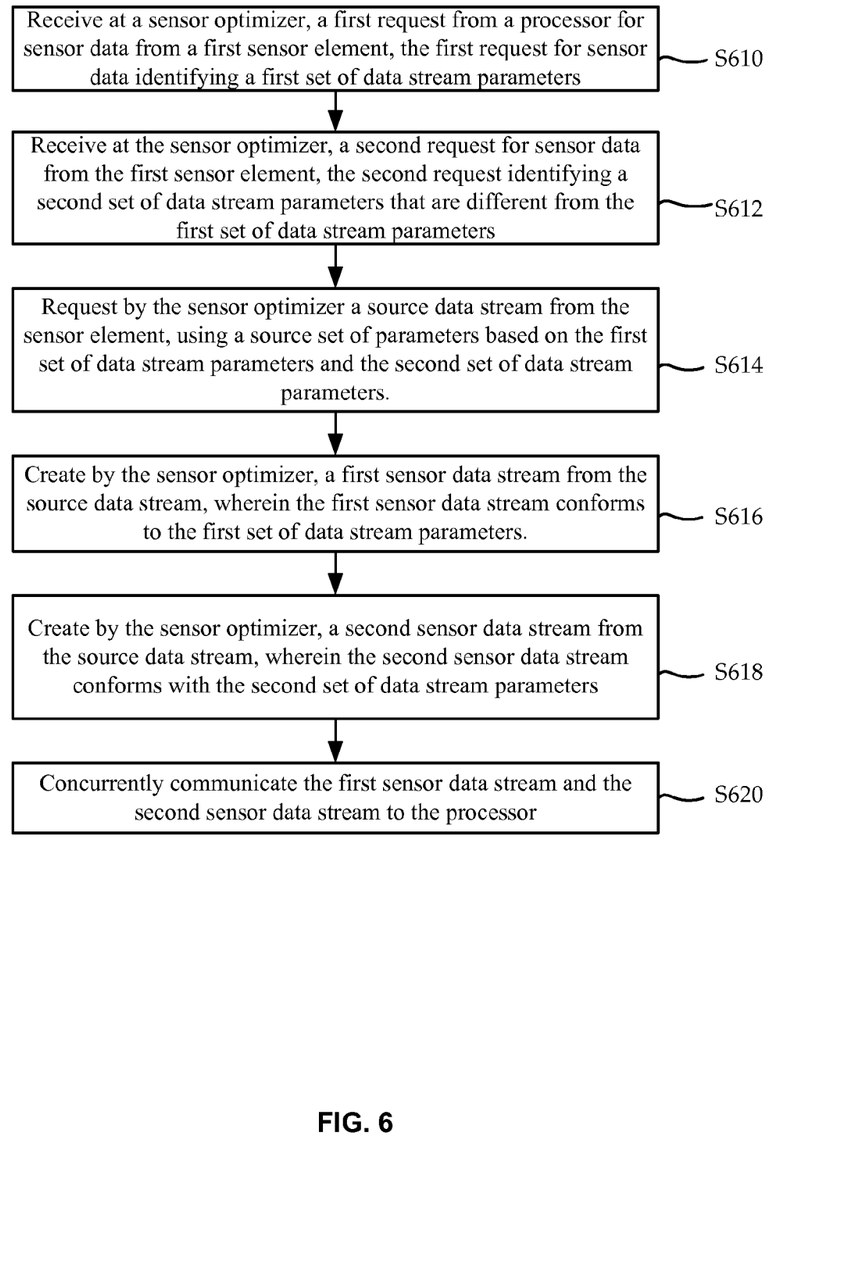
FIG. 6 illustrates a method according to some embodiments.

FIG. 6 describes an additional alternative method according to a potential embodiment. In S610, a sensor optimizer receives, a first request from a processor for sensor data from a first sensor element, the first request for sensor data identifying a first set of data stream parameters. In S612, the sensor optimizer receives a second request for sensor data from the first sensor element, the second request identifying a second set of data stream parameters that are different from the first set of data stream parameters.

In S614, the sensor optimizer requests a source data stream from the sensor element, using a source set of parameters based on the first set of data stream parameters and the second set of data stream parameters. In S616, the sensor optimizer creates a first sensor data stream from the source data stream, where the first sensor data stream conforms to the first set of data stream parameters.

In S618 the sensor optimizer creates a second sensor data stream from the source data stream, where the second sensors data stream conforms with the second set of data stream parameters. In S620, the sensor optimizer concurrently communicates the first sensor data stream and the second sensor data stream to a processor.

An example of a computing system in which various aspects of a device having one or more sensor elements and that operates a plurality of applications concurrently may be implemented will now be described with respect to FIG. 7. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a camera and/or a display unit. Examples of a hand-held device include but are not limited to video game consoles, tablets, smart phones, televisions, and mobile devices. In one embodiment, the system 700 is configured to implement any of the methods described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like. In some embodiments, the one or more processor 710 may be configured to perform a subset or all of the functions described above with respect to FIGS. 1 and 2. For example, as described above any combination of applications 190a-d may be implemented using one or more processors 710. The processor 710 may comprise a general processor and/or and application processor, for example. In various embodiments, the processor is integrated into an element that processes camera inputs, gyroscope inputs, or other sensor element input that may be modified by additional elements such as analog to digital converters or digital data outputs such as digital data output 120.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 2, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The processor 710, memory 735, operating system 740, and/or application programs 745 may be used to implement various blocks described with respect to FIGS. 1-2.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example methods described with respect to FIGS. 1-2.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
   receiving a first request from a processor for calibrated sensor data from a first sensor element, the first request for the calibrated sensor data identifying a first set of data stream parameters;
   receiving a second request for uncalibrated sensor data from the first sensor element, the second request for the uncalibrated sensor data identifying a second set of data stream parameters that are different from the first set of data stream parameters;
   in response to receiving both the first and second requests, requesting a source data stream from the first sensor element, using a source set of parameters based on the first set of data stream parameters and the second set of data stream parameters;
   creating a first sensor data stream from the source data stream, wherein the first sensor data stream conforms to the first set of data stream parameters and comprises the calibrated sensor data;
   creating a second sensor data stream from the source data stream, wherein the second sensor data stream conforms to the second set of data stream parameters and comprises the uncalibrated sensor data; and
   concurrently communicating the first sensor data stream and the second sensor data stream to the processor.

2. The method of claim 1 wherein the first request for the calibrated sensor data is received from a first application operating on the processor and wherein the second request for the uncalibrated sensor data is received from the first application operating on the processor.

3. The method of claim 1 wherein the first request for the calibrated sensor data is received from a first application operating on the processor and wherein the second request for the uncalibrated sensor data is received from a second application operating on the processor.

4. The method of claim 3 wherein the first application comprises a camera application and the second application comprises a navigation application.

5. The method of claim 4 wherein the first sensor element comprises a gyroscope.

6. The method of claim 3 wherein the first sensor element comprises an accelerometer.

7. The method of claim 6 wherein the first application comprises a user interface orientation control application and wherein the second application comprises a navigation application.

8. The method of claim 3 wherein creating the first sensor data stream and the second sensor data stream comprises:
   receiving the source data stream from the first sensor element at a signal multiplexer;
   outputting the first sensor data stream from the signal multiplexer to a first output register; and
   outputting the second sensor data stream from the signal multiplexer to a second output register.

9. The method of claim 8 wherein concurrently communicating the first sensor data stream to the first application and the second sensor data stream to the second application comprises:
   communicating the first sensor data stream from the first output register to the first application of the processor via a sensor addresser beginning at a first time and ending at a second time; and
   communicating the second sensor data stream from the second output register to the second application of the processor via the sensor addresser beginning at a third time and ending at a fourth time, wherein the third time is later than the first time and the third time is earlier than the second time.

10. The method of claim 1 wherein the first request for the calibrated sensor data is received from a first application operating on the processor and wherein the second request for the uncalibrated sensor data is received from a second application operating on a second processor within a mobile device that comprises the processor.

11. A device comprising:
   a first sensor comprising a first sensor element;
   a sensor optimizer coupled to the first sensor; and
   a processor coupled to the first sensor via the sensor optimizer;
   wherein the sensor optimizer is configured to:
      receive first and second requests for sensor data from the first sensor, the first and second requests for sensor data identifying first and second sets of data stream parameters, the first request for sensor data comprising a request for calibrated sensor data, and the second request for sensor data comprising a request for uncalibrated sensor data;
in response to receiving the respective requests, request a source data stream from the first sensor element, using a source set of parameters based on the first and second sets of data stream parameters; and
receive a source sensor data stream from the first sensor; and
concurrently output to the processor at least two sensor data streams derived from the source sensor data stream, a first sensor data stream comprising the calibrated sensor data and a second sensor data stream comprising the uncalibrated sensor data.

12. The device of claim 11 wherein the sensor optimizer comprises:
a plurality of digital filters coupled to the first sensor element by a signal multiplexer;
a plurality of output registers, each output register coupled to one corresponding digital filter of the plurality of digital filters; and
a sensor addresser coupled to the plurality of output registers.

13. The device of claim 12 wherein the sensor optimizer further comprises a first calibration module;
wherein the plurality of digital filters comprises a first digital filter and a second digital filter;
wherein the processor executes a plurality of applications, each application of the plurality of applications providing a set of data stream parameters to the processor for communication to the sensor addresser as part of a request for sensor data by each application of the plurality of applications;
wherein the plurality of output registers comprises a first output register coupled to the first digital filter and a second output register coupled to the second digital filter; and
wherein the first digital filter is coupled to the first output register via the first calibration module.

14. A device comprising:
means for receiving first and second requests for sensor data from a first sensor, the first and second requests for sensor data identifying first and second sets of data stream parameters, the first request for sensor data comprising a request for calibrated sensor data, and the second request for sensor data comprising a request for uncalibrated sensor data;
means for requesting a source data stream from the first sensor, using a source set of parameters based on the sets of data stream parameters in response to receiving the respective requests;
means for receiving a source sensor data stream from a sensor;
means for creating at least two different sensor data streams derived from the source sensor data stream; and
means for concurrently outputting the at least two different sensor data streams to a processor, a first sensor data stream comprising the calibrated sensor data and a second sensor data stream comprising the uncalibrated sensor data.

15. The device of claim 14 further comprising:
means for intercepting requests for sensor data streams from the processor to the sensor; and
means for adjusting a set of sensor stream parameters for each sensor data stream to match requested sensor stream parameters from the intercepted requests for sensor data streams.

16. The device of claim 14 further comprising:
means for receiving a second source data stream from a second sensor;
means for creating second at least two different sensor data streams derived from the second source sensor data stream; and
means for concurrently outputting the second at least two different sensor data streams to the processor.

17. A non-transitory computer readable storage medium comprising computer readable instructions that, when executed by a processor coupled to the storage medium, cause a device to:
communicate from the processor to a sensor optimizer, a first request for calibrated sensor data from a first sensor element, the first request for the calibrated sensor data identifying a first set of data stream parameters;
communicate from the processor to the sensor optimizer, a second request for uncalibrated sensor data from the first sensor element, the second request for the uncalibrated sensor data identifying a second set of data stream parameters that are different from the first set of data stream parameters;
in response to receiving both the first and second requests, request, by the sensor optimizer, a source data stream from the first sensor element, using a source set of parameters based on the first set of data stream parameters and the second set of data stream parameters;
create, by the sensor optimizer, a first sensor data stream from the source data stream, wherein the first sensor data stream conforms to the first set of data stream parameters and comprises the calibrated sensor data;
create, by the sensor optimizer, a second sensor data stream from the source data stream, wherein the second sensor data stream conforms with the second set of data stream parameters and comprises the uncalibrated sensor data; and
concurrently receive at the processor the first sensor data stream and the second sensor data stream.

18. The non-transitory computer readable storage medium of claim 17 further comprising computer readable instructions that cause the device to:
execute, by the processor, a first application that initiates the first request for calibrated sensor data; and
execute, by the processor, a second application concurrent with the execution of the first application, wherein the second application initiates the second request for uncalibrated sensor data.

* * * * *